United States Patent
Morrow et al.

(10) Patent No.: US 7,386,648 B2
(45) Date of Patent: Jun. 10, 2008

(54) PC CARD CONTROLLER WITH REDUCED NUMBER OF TERMINALS

(75) Inventors: Neil Morrow, San Jose, CA (US); Allen Li, San Jose, CA (US)

(73) Assignee: O2 Micro International Limited, Grand Cayman (KY)

( * ) Notice: Subject to any disclaimer, the term of this patent is extended or adjusted under 35 U.S.C. 154(b) by 235 days.

(21) Appl. No.: 10/970,891

(22) Filed: Oct. 21, 2004

(65) Prior Publication Data

US 2005/0120253 A1    Jun. 2, 2005

Related U.S. Application Data

(60) Provisional application No. 60/514,169, filed on Oct. 24, 2003.

(51) Int. Cl.
*G06F 13/00* (2006.01)

(52) U.S. Cl. ..................... 710/302; 710/104
(58) Field of Classification Search ........ 710/300–302, 710/104–105, 305–306, 311; 709/238; 702/127
See application file for complete search history.

(56) References Cited

U.S. PATENT DOCUMENTS

| | | | |
|---|---|---|---|
| 5,613,130 A * | 3/1997 | Teng et al. ................. | 713/300 |
| 5,680,288 A * | 10/1997 | Carey et al. ................ | 361/118 |
| 5,758,171 A | 5/1998 | Ramamurthy et al. . | 395/750.01 |
| 5,862,393 A * | 1/1999 | Davis ......................... | 713/300 |
| 5,964,850 A | 10/1999 | Castell et al. ................. | 710/14 |
| 6,041,374 A * | 3/2000 | Postman et al. .............. | 710/73 |
| 6,067,234 A * | 5/2000 | Kim et al. ................... | 361/737 |
| 6,230,209 B1* | 5/2001 | Zenda ......................... | 709/247 |
| 6,243,831 B1* | 6/2001 | Mustafa et al. ............... | 714/24 |
| 6,728,822 B1* | 4/2004 | Sugawara et al. .......... | 710/311 |
| 6,983,337 B2* | 1/2006 | Diamant ...................... | 710/48 |
| 2002/0152047 A1 | 10/2002 | Oh et al. ..................... | 702/122 |
| 2003/0038177 A1 | 2/2003 | Morrow ...................... | 235/441 |
| 2004/0156151 A1 | 8/2004 | Morrow ....................... | 361/18 |
| 2004/0204898 A1* | 10/2004 | Huang et al. ............... | 702/127 |
| 2005/0066212 A1* | 3/2005 | Chiao et al. ................ | 713/401 |

FOREIGN PATENT DOCUMENTS

EP      0672987       9/1995

* cited by examiner

*Primary Examiner*—Clifford H Knoll

(57) ABSTRACT

A PC Card subsystem is used for coupling a PC card to a computer system and comprises a PC Card controller and a PC Card power switch. The PC Card controller is coupled to and operates the PC card. The PC Card power switch is used for supplying power to the PC Card and provides at least one control signal for operating the PC card.

42 Claims, 10 Drawing Sheets

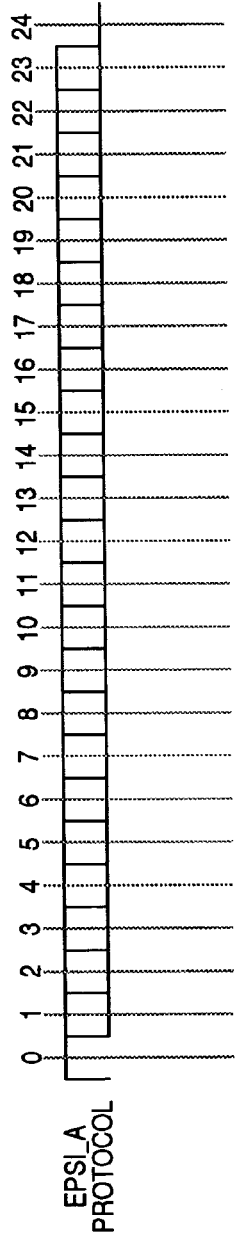

| Clock | Cycle Definition | Direction[1] | Clock | Cycle Definition | Direction |
|---|---|---|---|---|---|
| 0 | Start Cycles, Asserted High-One | | 13 | State of REQ# | O |
| 1 | State of REQ# | O | 14 | Prior Art Type PC Card Power Control | O |
| 2 | State of INTA# | O | 15 | Prior Art Type PC Card Power Control | O |
| 3 | State of SPKR# | O | 16 | State of REQ# | O |
| 4 | State of REQ# | O | 17 | Prior Art Type PC Card Power Control | O |
| 5 | Reserved | O | 18 | Prior Art Type PC Card Power Control | O |
| 6 | Prior Art Type PC Card Power Control | O | 19 | State of REQ# | O |
| 7 | State of REQ# | O | 20 | Prior Art Type PC Card Power Control | O |
| 8 | Prior Art Type PC Card Power Control | O | 21 | Prior Art Type PC Card Power Control | O |
| 9 | Prior Art Type PC Card Power Control | O | 22 | State of REQ# | O |
| 10 | State of REQ# | O | 23 | Prior Art Type PC Card Power Control | O |
| 11 | Prior Art Type PC Card Power Control | O | 24 | Stop Cycle, Asserted Low - Zero | |
| 12 | Prior Art Type PC Card Power Control | O | | | |

Note 1: Direction O (Output) is driven by PC Card controller and Input by PC Card power switch. Direction I (Input) is driven by PC Card power switch and input by PC Card controller.

FIG. 6

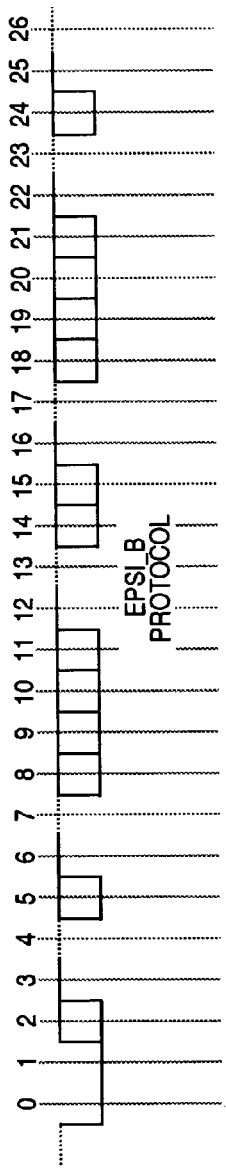

| Clock | Cycle Definition | Direction[1] | Clock | Cycle Definition | Direction |
|---|---|---|---|---|---|
| 0 | Start Cycle A, Drive Low | 1 | 14 | State of VS1 Output Enable | 0 |
| 1 | Start Cycle B, Drive Low | 1 | 15 | State of VS2 Output Enable | 0 |
| 2 | State of GNT# | 1 | 16 | Turn Around Cycle A, Drive High | 0 |
| 3 | Turn Around Cycle A, Drive High | 1 | 17 | Turn Around Cycle B, Hi-Z | - |
| 4 | Turn Around Cycle B, Hi-Z | - | 18 | State of GNT# | 1 |
| 5 | Reserved | 0 | 19 | State of VS1 Input | 1 |
| 6 | Turn Around Cycle A, Drive High | 0 | 20 | State of VS1 Input | 1 |
| 7 | Turn Around Cycle B, Hi-Z | - | 21 | State of GNT# | 1 |
| 8 | State of GNT# | 1 | 22 | Turn Around Cycle A, Drive High | 1 |
| 9 | State of CD1# Input | 1 | 23 | Turn Around Cycle B, Hi-Z | - |
| 10 | State of CD2# Input | 1 | 24 | Reserved | 0 |
| 11 | State of GNT# | 1 | 25 | Turn Around Cycle A, Drive High | 0 |
| 12 | Turn Around Cycle A, Drive High | 1 | 26 | Turn Around Cycle B, Hi-Z | - |
| 13 | Turn Around Cycle B, Hi-Z | - | | | |

Note 1: Direction O (Output) is driven by PC Card controller and Input by PC Card power switch. Direction I (Input) is driven by PC Card power switch and input by PC Card controller.

FIG. 7

| Clock | Cycle Definition | Direction[1] |
|---|---|---|
| 0 | Start Cycle A, Drive Low | 0 |
| 1 | Start Cycle B, Drive Low | 0 |
| 2 | INTAN | 0 |
| 3 | SCIO_OUT | 0 |
| 4 | SCIO_OEN | 0 |
| 5 | VS1_OEN | 0 |
| 6 | VS2_OEN | 0 |
| 7 | TEST_MODE | 0 |
| 8 | USB_ON | 0 |
| 9 | Turn Around Cycle A, Drive High | 0 |
| 10 | Turn Around Cycle B, Hi-Z | - |
| 11 | SCIO_IN | 1 |
| 12 | CD1_IN | 1 |
| 13 | CD2_IN | 1 |
| 14 | SV1_IN | 1 |
| 15 | VS2_IN | 1 |
| 16 | Turn Around Cycle A, Drive High | 1 |
| 17 | Turn Around Cycle B, Hi-Z | - |
| 18 | INTAN | 0 |
| 19 | SCIO_OUT | 0 |
| 20 | SCIO_OEN | 0 |
| 21 | VCCA3N | 0 |
| 22 | VCCA5N | 0 |
| 23 | VCCB3N | 0 |
| 24 | VCCB5N | 0 |
| 25 | Turn Around Cycle A, Drive High | 0 |
| 26 | Turn Around Cycle B, Hi-Z | - |
| 27 | SCIO_IN | 1 |
| 28 | MSCDN | 1 |
| 29 | SDCDN | 1 |
| 30 | XDCDN | 1 |
| 31 | SCCDN | 1 |

Continued on sheet 9/9

Note 1: Direction O (Output) is driven by the Samurai controller and input by the Tsunami power switch. Direction I (Input) is driven by the Tsunami power switch and input by the Samurai controller.

FIG. 8

| Clock | Cycle Definition | Direction |
|---|---|---|
| 32 | Turn Around Cycle A, Drive High | 1 |
| 33 | Turn Around Cycle B, Hi-Z | - |
| 34 | INTAN | 0 |
| 35 | SCIO_OUT | 0 |
| 36 | SCIO_OEN | 0 |
| 37 | SC_CLKSEL1 | 0 |
| 38 | SC_CLKSEL0 | 0 |
| 39 | SC_RST | 0 |
| 40 | SC_RST_OEN | 0 |
| 41 | Turn Around Cycle A, Drive High | 0 |
| 42 | Turn Around Cycle B, Hi-Z | - |
| 43 | SCIO_IN | 1 |
| 44 | MCWPN | 1 |
| 45 | CSTSCHG_BVD1 | 1 |
| 46 | RSVD | 1 |
| 47 | Turn Around Cycle A, Drive High | 1 |
| 48 | Turn Around Cycle B, Hi-Z | - |
| 49 | INTAN | 0 |
| 50 | SCIO_OUT | 0 |
| 51 | SCIO_OEN | 0 |
| 52 | SYNC_CLK | 0 |
| 53 | SCPSB | 0 |
| 54 | SKT_LED | 0 |
| 55 | MC_LED | 0 |
| 56 | MC3VN | 0 |
| 57 | Turn Around Cycle A, Drive High | 0 |
| 58 | Turn Around Cycle B, Hi-Z | - |
| 59 | SCIO_IN | 1 |
| 60 | RSVD | 1 |
| 61 | RSVD | 1 |
| 62 | Turn Around Cycle A, Drive High | 1 |
| 63 | Turn Around Cycle B, Hi-Z | - |

Continuation of Fig. 8 on sheet 8/9

FIG. 8 (Continued)

PC CARD CONTROLLER WITH REDUCED NUMBER OF TERMINALS

CROSS REFERENCE TO RELATED APPLICATION

This application claims priority to the now abandoned provisional patent application Ser. No. 60/514,169, entitled "Method for Transferring PC Card Controller Terminals to a Power Switch Device," with filing date Oct. 24, 2003, assigned to the assignee of the present application, and hereby incorporated by reference in its entirety.

BACKGROUND OF THE INVENTION

1. Field of the Invention

The present invention relates to a PC Card controller and a PC card power switch for coupling a PC Card to a computer system, and more particularly, to a PC Card controller having a reduced pin-count so as to manufacture the PC Card controller and the PC Card power switch with more cost effectiveness.

2. Description of the Related Art

PC Cards (16-bit PCMCIA cards and 32-bit CardBus cards) are widely installed in computer systems, particularly in notebook or laptop computers. PC Cards allow an exchangeable method for users to interface various functions such as modems and data storage to a computer system. The PC Card Standard publishes specifications for the form factor, power requirements, electrical interfaces, etc., of these cards to ensure interoperability between many computer system manufacturers. By complying with the PC Card Standard, a computer system manufacturer can enable these modular functions on their machine via PC Card connectivity.

There have been several manufacturers which provide similar PCI-based products to bridge or couple a PCI bus in a computer system to a PC Card controller. For example, some basic versions are available from Texas Instruments Inc. under the trade name PCI1410, O2 Micro International Limited under the trade name OZ6912, ENE Technology Inc. in Taiwan under the trade name CB1410, and Ricoh Co. Limited under the trade name R5C475.

Even in the most basic versions of PC Card controllers, there is a large number of signals required to meet the PCI and PC Card specification and a few other conventional signals required to meet widely adopted system-level interface guidelines and de-facto standards. The large signal count has been accommodated by PC Card controllers, which are packaged in a de-facto standard 144-pin QFP package, 144/145 ball BGA package, and 128-pin QFP package.

It should be understood that adding signals will take die area and increase the cost of the packaging. Die area is proportional to chip cost typically on a non-linear and continuous cost versus size curve. Regarding packaging, the curve of cost versus pin-count is typically a step function, because there are not industry standard packages available for every pin-count. For example, a few examples of industry standard packages for QFP-type package are 80-pins, 100-pins, 120-pins, 128-pins, and 144-pins. The size and pin count of the package are large factors in package cost. Furthermore, reducing the pin count of PC Card controller also reduces the board area of the printed circuit board of the PC Card controller.

Conventional PC Card Controller Terminals

Even in the most basic versions of PC Card controllers, there is a large number of signals required to meet the PCI and PC Card specifications and a few other conventional signals to meet widely adopted system-level interface guidelines and de-facto standards.

PC Card controllers on the market today comply with the PCI Specification v2.3. The PCI Specification includes a definition of over 60 signals including communication protocols and input/output electrical specifications. PC Card controllers typically implement the following conventional PCI input and/or output terminals:

a) PCI Arbitration Signals: REQ# and GNT#;
b) PCI Control Signals: FRAME#, IRDY#, TRDY#, STOP#, DEVSEL#, PERR#, SERR#;
c) PCI Address/Data Signals: AD31:0;
d) PCI Command and Byte Enable Signals: C/BE3:0#;
e) PCI Configuration Cycle Select: IDSEL;
f) PCI Interrupts: INTA#; and
g) PCI Clock: CLK.

PC Card controllers on the market today also comply with the PC Card Standard, Release 8.0. The PC Card Standard includes a definition of over 60 signals including protocols and input/output electrical specifications. The signals for the 16-bit version of a PCMCIA card are multiplexed with the 32-bit CardBus definitions. PC Card controllers typically implement the following conventional PC Card input/output terminals:

a) CardBus Arbitration Signals: CREQ# and CGNT#;
b) CardBus Control Signals: CFRAME#, CIRDY#, CTRDY#, CSTOP#, CDEVSEL#;
c) CardBus Address/Data Signals: CAD31:0;
d) CardBus Command and Byte Enable Signals: CC/BE31:0#;
e) CardBus Interrupts: CINT#;
f) CardBus Clock: CCLK;
g) PCMCIA 16-bit Signals Not Multiplexed with CardBus Signals: D2, D14, A18; and
h) PC Card Detection and Voltage Sense Signals: CI1#, CD2#, VS1, VS2.

A few conventional PC Card controller terminal functions are used to meet widely adopted system-level interface guidelines and de-facto standards. In practice today, some of these conventional PC Card controller terminal functions are multiplexed to the same terminal, and generally configurable for one function or another, to reduce pin-count. These are listed as below:

a) PC Card audio output that controls an audio driver from a PC Card source: named SPKR# here;
b) PC Card activity indicator output that typically controls an LED: named SKT_LED here;
c) PCI reset input: named PRST# here;
d) PCI clock control, via "clock run protocol" terminal, de-factor standard: named CLKRUN# here;
e) Power management context reset: named GRST# here;
f) ACPI power management event: named PME# here;
g) PCMCIA ring indicator, for PCMCIA modems to wake system: named RI_OUT here;
h) Serialized legacy IRQ protocol terminal: named IRQSER here;
i) Parallel power switch communication terminals: named VCCD0#, VCCD1#, VPPD0, VPPD1 here; and
j) Serial power switch communication terminals: named CLOCK, DATA, LATCH here.

Extra-Function Terminals

Several new functions have been integrated into the PC Card controllers in practice today; for example, IEEE1394

Link or Link+PHY (Physical Layer) circuitry, Smart Card Readers, Flash Media Readers, and SDIO Readers. Other ideas such as IrDA controllers and Networking controllers integrated into the PC Card controller have been conceived. In many cases where a new function is integrated into the PC Card controller, new terminals are needed to fulfill the application of the new function and called extra-function terminals herein.

Examples of the extra-function terminals are provided below:
a) The Smart Card interface defined by ISO7816;
b) The SD memory Card interface defined by the SDA (Secure Digital Association);
c) The SmartMedia interface defined by the SSFDC Forum;
d) The xD-Picture Card interface defined by FujiFlim and Olympus;
e) The High Speed Serial Bus Electrical interface Defined by the IEEE1394 Standard; and
f) The PHY/Link Interface defined by the IEEE1394-2000 Standard.

The addition of extra-function terminals typically increases the pin-count of the PC Card controller. In other cases, the extra-function terminals are provided on reserved and/or unused terminals functions of a typical PC Card controller. However, PC Card controller manufacturers continue to remove reserved and unused terminal functions, so it is difficult to find locations for extra-function terminals without increasing the pin-count of the PC Card controller.

Extra-function terminals herein are associated with functions integrated into a PC Card controller. For example, if a PC Card controller is enhanced to include Smart Card reader logic, then any new terminals included in the PC Card controller beyond the conventional PC Card controller terminals and related to the use of the Smart Card logic are categorized as extra-function terminals. In this example, the terminal used for Smart Card detection is an extra-function terminal.

Conventional PC Card Power Switches

When a PC Card is inserted into the PC Card connector, the connection is detected by a conventional PC Card controller by means of card detect and voltage sense signals, also called CD/VS signals. The CD/VS signals indicate the electrical interface and voltage requirements of the PC Card. The PC Card controller enables the appropriate electrical interface to the card, and communicates via electrical control signals to the PC Card power switch indicating the voltage requirements of the card. The PC Card power switch will enable/apply VCC and VPP power, as specified in the PC Card Standard, to the PC Card based on the control information.

Control information is provided from the PC Card controller to the PC Card power switch by a power switch communication protocol, depending on the switch used in the system. There are two de-facto standard power switch control interfaces and associated communication protocols that are used today: a serial control interface using a serial communication protocol, and a parallel control interface using a parallel communications protocol. For example, serial PC card power switches are available from Texas Instruments Inc. under the trade name TPS2206 and 02 Micro International Limited under the trade name OZ2206. For example, parallel PC Card power switches are available from Texas Instruments Inc. under the trade name TPS2211 and O2 Micro international Limited under the trade name OZ2211. Data sheets for the TPS2206 and TPS2211 illustrate the serial and parallel control protocols in detail.

Conventional PC Card power switch terminals include:
a) Power supply terminals that input power from the system, and a reference ground;
b) Socket source terminals that output power to the VCC and VPP power rails of the PC Card;
c) PC Card power control terminals (e.g. parallel protocol, serial protocol, shut down control signal); and
d) Optional PC Card power status terminals.

Examples of optional power status terminals are over-current indicators, over-temperature indicators, and voltage-level indicators (e.g. VCC and/or VPP is inside a predetermined voltage range).

Prior Art Illustrations

Referring to FIG. 1, a typical PC Card subsystem 150 of a computer system 102 in the prior art is illustrated. The PC Card subsystem 150 includes a PC Card connector 105 for receiving a PC Card 106, and a PC Card controller 100 coupled to the PC Card connector 105. The PC Card controller 100 is also coupled to a host bus 101, and to a host bus controller 114 to provide the connection to the system CPU and other elements of the computer system 102. The PC Card controller 100 includes logic 100a that communicates with the host bus 101 using PC Card communication protocols, and provides PC Card electrical interface input/output signals 108 for connectivity to the PC Card 106. The controller 100 also provides conventional terminal function 110 used to meet widely adopted system-level interface guidelines and de-facto standards.

It is common to integrate extra-function logic 100b into the PC Card controller 100 to provide more functionality, and typically this extra-function logic provides input/output signals 115 to provide connectivity to control and data elements associated with the extra integrated function.

When a PC Card 106 is inserted into the PC Card connector 105, the connection is detected by the PC Card controller 100 by means of card detect and voltage sense signals 107, also called CD/VS signals. The CD/VS signals indicate the electrical interface 111 of the PC Card 106, e.g., CardBus or 16-bit R2 electrical interface, and voltage requirements of the PC Card 106. The PC Card controller 100 enables the appropriate electrical interface to the card, and outputs electrical control signals 103 to the PC Card power switch 104 for indicating the voltage requirements of the PC Card 106.

The PC Card power switch 104 switches VCC and VPP power 109, as specified in the PC Card standard, to the PC Card 106 based on the control signals 103. The power switched to the socket is sourced from inputs 112 to the PC Card power switch 104. The power switch 104 may provide one or more socket power status outputs 113 that indicate card power related information such as over-current conditions, over-temperature conditions, and voltage-level conditions, e.g., VCC and/or VPP is inside or outside a predetermined voltage range.

Referring to FIG. 2, another typical PC Card subsystem 250 of a computer system 202 in the prior art is illustrated. The PC Card subsystem 250 is similar to the PC Card subsystem 150 shown in FIG. 1, wherein the same reference numbers refer to the same members. The PC Card controller 200 is coupled to a PCI host bus and to a PCI host bus controller 214 by means of the PCI bus REQ# 223 and GNT# 228 arbitration signals, a PCI bus interrupt signal 225, and other conventional PCI bus signal 224 defined in the PCI Specification. In this less generalized example, the extra-function logic integrated into the PC Card controller is Smart Card reader logic 200b, and the Smart Card input/output signals 227 provide data and control signals associated with Smart Cards.

The controller 200 in FIG. 2 also provides conventional terminal functions, including an output signal, SPKR# 226 for PC Card audio and other signals 221 used to meet widely adopted system-level interface guidelines and de-facto standards, e.g., PCI clock control CLKRUN# protocol.

In summary, there exists a need for a PC Card controller which is able to minimize the number of the terminals. The present invention provides this and other advantages.

SUMMARY OF THE INVENTION

It is an object of the present invention to provide a PC Card controller which is able to minimize the number of the terminals.

In order to achieve the above object, the present invention provides a PC Card subsystem for coupling a PC card to a computer system and comprising a PC Card controller and a PC Card power switch. The PC Card controller is coupled to and operates the PC card. The PC Card power switch is used for supplying power to the PC Card and provides at least one control signal for operating the PC card.

BRIEF DESCRIPTION OF THE DRAWINGS

Other objects, advantages, and novel features of the invention will become more apparent from the following detailed description when taken in conjunction with the accompanying drawings.

FIG. 6 illustrates the communication protocol of a PC Card power switch for EPSI_A signal according to an embodiment of the present invention.

FIG. 7 illustrates the communication protocol of a PC Card power switch for EPSI_B signal according to an embodiment of the present invention.

FIG. 8 illustrates the communication protocol of a PC Card power switch for EPSI signal according to an embodiment of the present invention.

DETAILED DESCRIPTION

Figure 1:
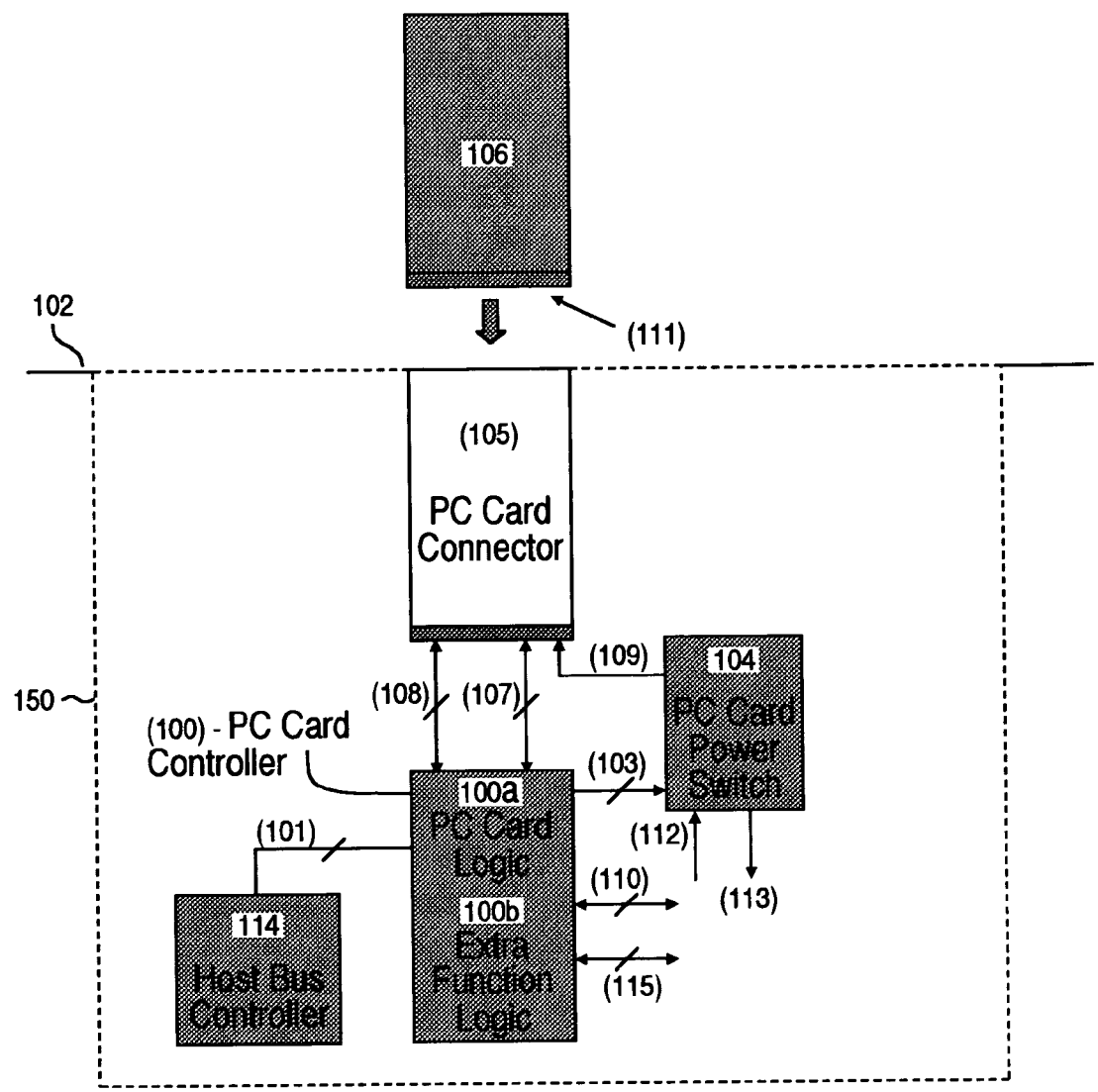
FIG. 1 is a block diagram of a typical PC Card subsystem of a computer system in the prior art.
Figure 2:
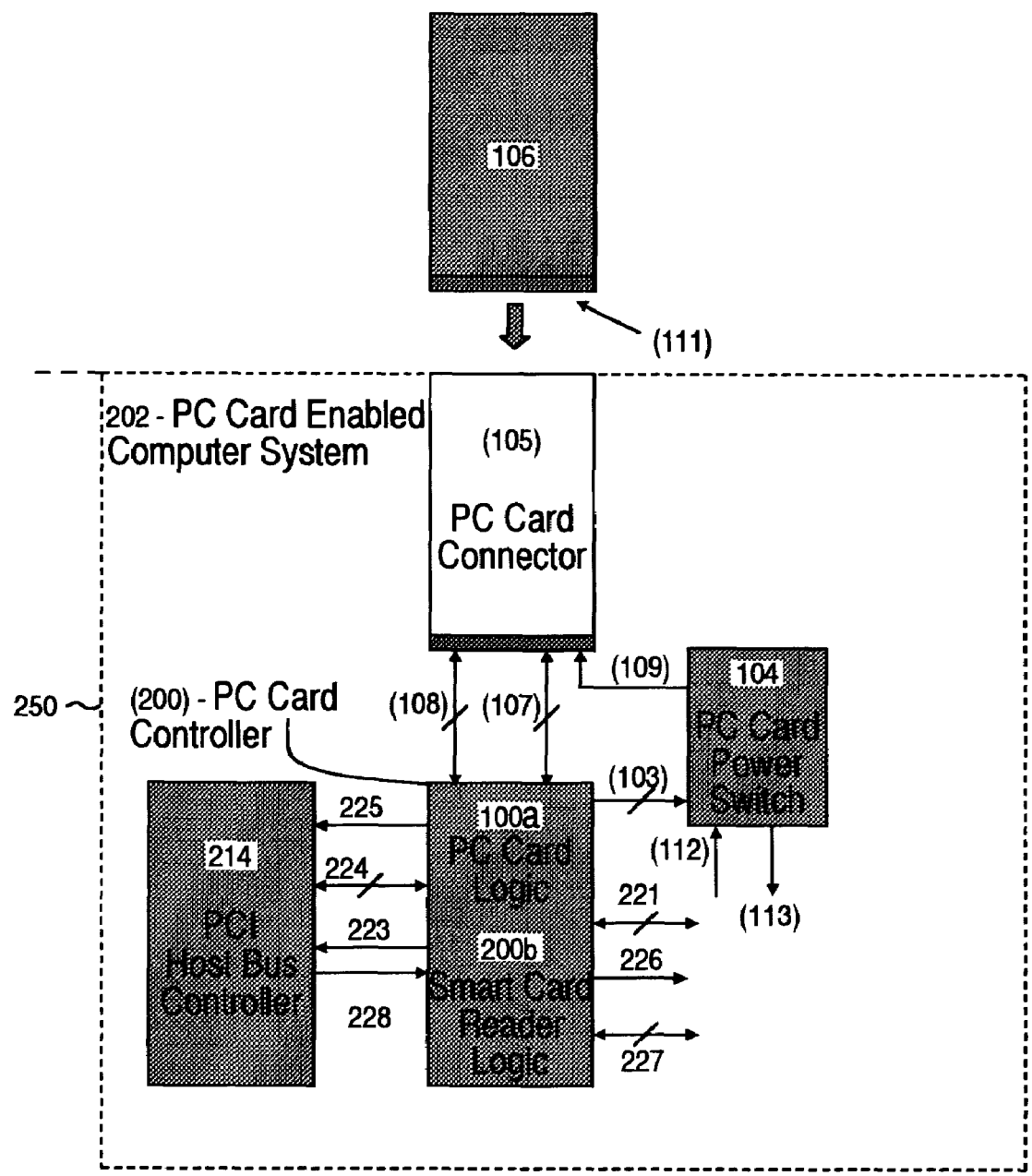
FIG. 2 is a block diagram of another typical PC Card subsystem of a computer system in the prior art.
Figure 3:
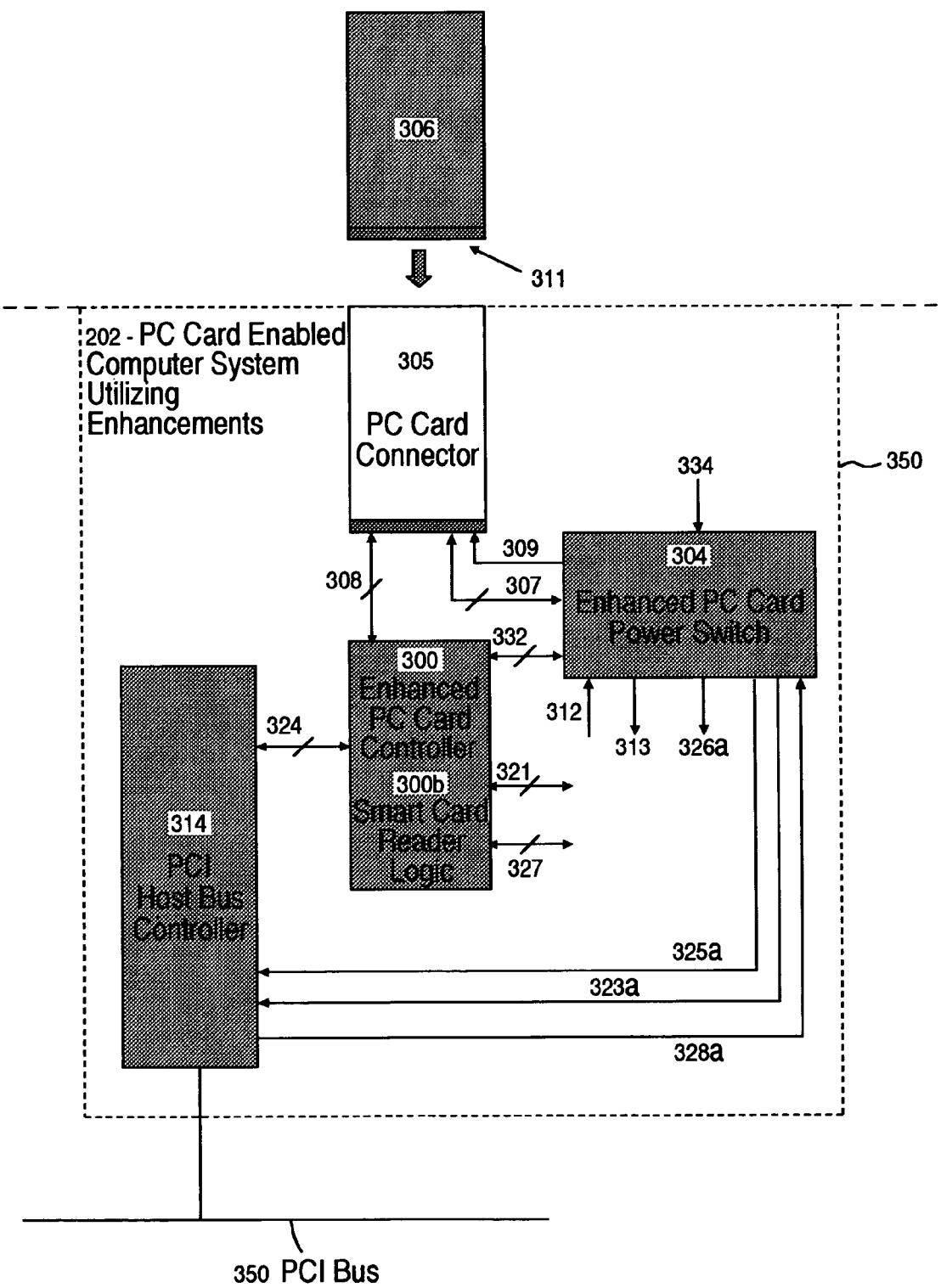
FIG. 3 is a block diagram of a PC Card subsystem of a computer system according to an embodiment of the present invention.

Referring to FIG. 3, a computer system 302 according to an embodiment of the present invention is illustrated. In the present embodiment, the computer system 302 includes a PC Card subsystem 350, a memory controller 380 coupling to the host bus controller 314, memory 384 coupled to the memory controller 380, and a CPU (central processing unit) 382 coupled to the memory controller 380. In the present embodiment, display controller 386 is coupled to the memory controller 380 through an interface, such as Accelerated Graphics Port (AGP) 388, for outputting display signals to a display 389, such as an LCD (liquid crystal display).

In the present embodiment, the PC Card subsystem 350 includes a PC Card controller 300, a PC Card connector 305, a host bus controller 314, and a PC Card power switch 304. The PC Card controller 300 is in communication with the PC Card power switch 304 through a communication interface 332 and a communication protocol.

While not to wishing to be bound by example, the following Detailed Description will proceed with reference to a PCI bus as the host bus; however, the present invention is not so limited. In this case, the PC Card subsystem 350 complies with the PCI Specification v2.3 and the PC Card Standard, Release 8.0.

Figure 4:
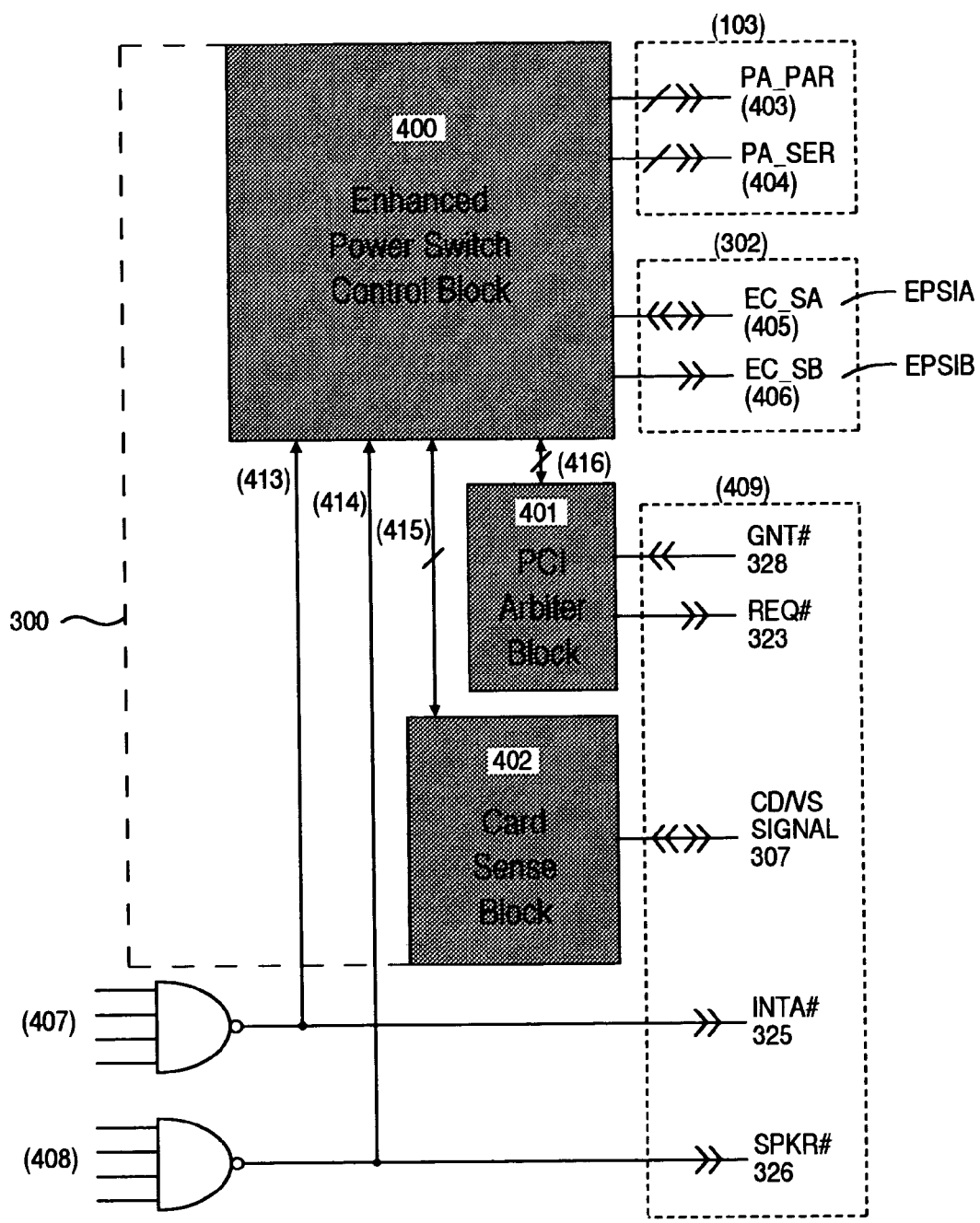
FIG. 4 is a block diagram of a PC Card controller shown in FIG. 3.

The PC Card subsystem 350 includes a PC Card connector 305 for receiving a PC Card 306. The PC Card controller 300 is coupled to the PC Card connector 305, and provides PC Card electrical interface input/output signals 308 for connectivity to the PC Card 306. Further, the PC Card controller 300 is coupled to a PCI host bus 380 and to a PCI host bus controller 314 to provide the connection to the system CPU and other elements of the computer system 302 using PC Card communication protocols. The PC Card controller 300 communicates with the PCI host bus controller 314 by means of PCI bus signal 324 which is defined in the PCI specification except for PCI bus REQ# arbitration signal 323, PCI bus GNT# arbitration signal 328, and a PCI bus interrupt signal 325 (FIG. 4).

According to an embodiment of the present invention, the extra-function logic integrated into the PC Card controller 300 of FIG. 3 is Smart Card reader logic 300b, and the Smart Card input/output signals 327 provide data and control signals associated with Smart Cards. The PC Card controller 300 also provides conventional terminal functions, including signals 321 used to meet widely adopted system-level interface guidelines and de-facto standards, e.g., PCI clock control CLKRUN# protocol.

When a PC Card 306 is inserted into the PC Card connector 305, the connection is detected by the PC Card power switch 304 by means of card detect and voltage sense signals 307, i.e., CD/VS signals. The CD/VS signals indicate the electrical interface 311 of the PC Card 306, e.g., CardBus or 16-bit R2 electrical interface, and voltage requirements of the PC Card 306. The PC Card power switch 304 is in communication with the PC Card controller 300 via the communication interface 332 and communication protocol for indicating the presence and the other information of the PC Card 306.

The PC Card power switch 304 switches VCC and VPP power 309, as specified in the PC Card standard, to the PC Card 306 based on the card detect and voltage sense signals 307. The power switched to the socket is sourced from inputs 312 to the PC Card power switch 304. The power switch 304 may provide one or more socket power status outputs 313 that indicate card power related information such as over-current conditions, over-temperature conditions, and voltage-level conditions (e.g., VCC and/or VPP is inside or outside a predetermined voltage range).

The communication protocol that is operated on the communication interface 332 contains information of the state of the CD/VS signals 307 for PC Card insertion/removal status and card identification purposes. The PC Card power switch 304 receives the CD/VS signal 307 from the PC card connector 305, and transmits state information of the CD/VS signal to the PC Card controller 300 via the communications protocol that is operated on the communication interface 332.

In the present embodiment, the communication protocol that is operated on the communication interface 332 contains information of the state of the SPKR# signal (shown in FIG. 6) for PC Card audio. The state information for the SPKR# signal is transmitted from the PC Card controller 300 to the PC Card power switch 304 using the communication interface 332. The PC Card power switch 304 includes a SPKR# output 326*a*, that is asserted according to the transmitted state information. In one embodiment, the communication protocol is a so-called frame-based protocol, and there are several cycles within one frame of the communication protocol. Therefore, the communication protocol operated on the communications interface 332 provides low latency communication of the SPKR# state information such that the architecturally inherent latency is negligible. The communication protocol will be described in further detail below (see FIG. 6, for example).

The communication protocol that is operated on the communication interface 332 of FIG. 3 also can contain information of the state of the INTA# signal (shown in FIG. 6) and REQ# signal (shown in FIG. 6) for communicating with a PCI bus. The state information for the INTA# and REQ# signals is transmitted from the PC Card controller 300 to the PC Card power switch 304 using the communication interface 332. The PC Card power switch 304 includes an INTA# output 325*a* and a REQ# output 323*a*, which are asserted according to the transmitted state information. The communication protocol operated on the communication interface 332 provides low latency communication of the INTA# and REQ# state information.

The communication protocol operated on the communication interface 332 of FIG. 3 contains information of the state of the GNT# signal (shown in FIG. 7) for PCI bus communication. The power switch 304 includes a GNT# input 328*a* coupled to the PCI bus host controller 314, and transmits state information regarding the GNT# signal to the PC Card controller 300 via the communications protocol and interface 332. The PC Card controller 300 uses the state information as if it was obtained by a dedicated GNT# terminal.

The PC Card power switch 304 of FIG. 3 includes a new clock reference 334 for sampling new input and timing outputs, and the PCI clock is the preferred clock since it is synchronous with the terminals of the PC Card controller 300. If the invention is used to transfer high-speed extra-function terminals or terminals that have low latency requirements to the power switch, a higher speed clock, such as a 30 ns clock, may be utilized. A lower speed clock can be used to save power if latency is not a critical concern.

Referring to FIG. 4, a block diagram of the PC Card controller 300 is illustrated according to an embodiment of the present invention. GNT# 328, REQ# 323, INTA# 325, SPKR# 326, and the CD/VS signal 307 are transferred to or provided in the PC Card power switch 304. It will be apparent to those skilled in the art that other terminal, such as extra-function terminals 327, can be transferred to the PC Card power switch 304.

In addition, the PC Card controller 300 may provide an optional conventional mode where the terminals or terminal map of the PC Card controller 300 complies with the conventional PC Card controller. When the enhancement is disabled or the conventional mode is enabled, terminals are provided for the conventional PC Card signals 409, including GNT# 328, REQ# 323, INTA# 325, SPKR# 326, and the CDNS signal 307. In such a conventional mode, a prior art or conventional type of PC Card power switch electrical interface 443 and communications protocol may be used, such as a conventional parallel power switch control interface 403 or a conventional serial power switch control interface 404. Both serial power switch control interface 404 and parallel power switch control interface 403 are provided and are multiplexed on the same terminals.

When the enhancement is enabled, those terminals for signals 409 are provided for other signals or functions, and terminals are provided on the PC Card power switch 304 for those signals and functions. In other words, those terminals for signals 409 are transferred to the PC Card power switch 304 when the enhancement is enabled. The protocol will operate with the power switch electrical interface 332 that may be multiplexed on the same terminals as the power switch electrical interface 443. The protocol described here operates with two signals, e.g., EPSI_A 405 and EPSI_B 406. The protocol provides information of the states of all the signals transferred to the PC Card power switch 304.

Referring to FIG. 4, several sources of interrupts 407 are coupled to the PC Card power switch 304 and the PC Card controller 300, and can cause assertion of INTA# 325. This state information about the INTA# signal is provided to the power switch control block 400 through an internal connection 413. Similarly, several sources of audio 408 are coupled the PC Card power switch 304 and the PC Card controller 300, and can cause assertion of SPKR# 326. This state information of the SPKR# signal is provided to the power switch control block 400 through an internal connection 414. The state information provided by the internal connections 413 and 414 is communicated to the power switch using the protocol and the interface 332.

The PCI arbiter block 401 requests access to the host (e.g., PCI) bus, which causes assertion of REQ# 323. In the controller 300, this request is provided to the power switch control block 400 through an internal connection 416, and the state of the PCI bus access request is communicated to the PC Card power switch 304 via the communication protocol and the communication interface 332.

Conventionally, the host PCI bus controller 314 will grant access to the PCI bus by asserting the GNT# signal 328, which is conventionally provided as a terminal in a PC Card Controller. In the PC Card controller 300 according to an embodiment of the present invention, this bus grant is provided to the PCI arbiter block 401 from the power switch control block 400 through an internal connection 416. The state of the PCI bus access grant is communicated from the PC Card power switch 304 using the communication protocol and the communication interface 332.

The CD/VS signals 307 include four signals: CD1#, CD2#, VS1#, and VS2#. The card sense block 402 uses these signals to determine the card presence, interface requirements and voltage level requirements. Typically, a conventional PC Card controller asserts VS1 and/or VS2 during the sensing process. Therefore, the VS1 and/or VS2 signals are considered input/output, and the CD1 and CD2 signals are generally considered inputs only. According to the present invention, the state information of the signals that would cause assertion of VS1 and/or VS2 is provided to the power switch control block 400 through an internal connection 415, and this state information is communicated to the PC Card power switch 304 using the communication protocol and the communication interface 332.

The CD/VS input state is provided to the card sense block 402 from the power switch control block 400 through an internal connection 415. The sampled value of the CD/VS inputs 307 is communicated from the power switch 304 using the protocol and the interface 332.

In another embodiment, a complete card sensing state machine is implemented in the power switch 304, and a signal communication provided to the PC Card controller 300 provides all required information, such as card presence, interface requirements, and voltage level requirements.

Figure 5:
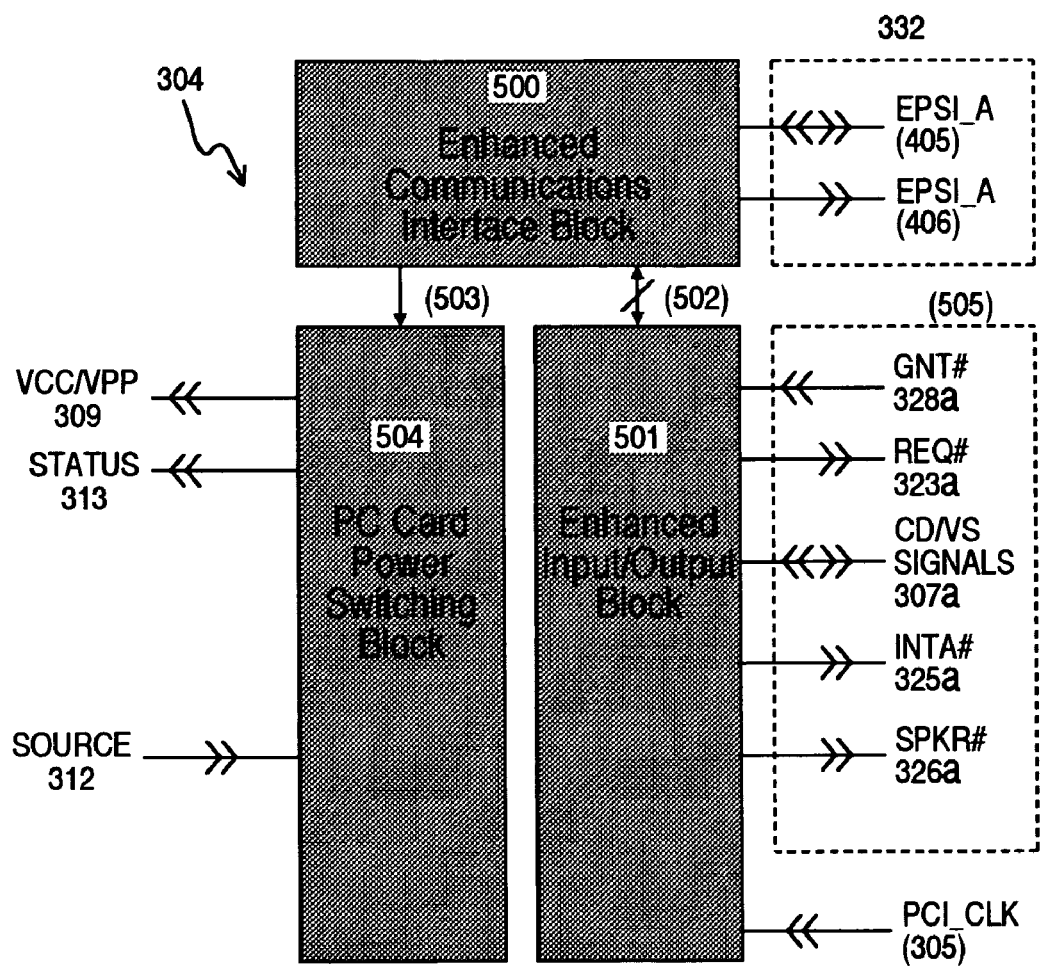
FIG. 5 is a block diagram of a PC Card power switch shown in FIG. 3.

Referring to FIG. 5, a block diagram of the PC Card power switch 304 is illustrated according to an embodiment of the present invention. The PC Card power switch 304 includes several PC Card terminals 505. The PC Card terminals 505 that are outputs are asserted under the control of an internal interface 502 between the communications block 500 and the input/output block 501. The internal interface 502 controls outputs based on the state information for each output provided in the communication protocol that operates on the electrical interface 332. The PC Card terminals 505 that are inputs are sampled by the input/output block 501. Sampled information is provided to the communications block 500 through an internal interface 502, and this state information is transmitted to the PC Card controller 300 through the communication protocol that operates on the electrical interface 332. The PC Card power switch 304 according to an embodiment of the present invention implements a PCI clock input 334 as a reference clock, which is used for sampling inputs and timing outputs.

The PC Card power switch 304 includes terminals, such as power source terminals 312, VCC/VPP power output terminals 309, and status indicators 313. The protocol includes conventional information which is used to control the state of the PC Card power, and this information is provided to the PC Card power switching block 504 by an internal interface 503.

Referring to FIG. 6, the PC Card power switch communication protocol for the EPSI_A signal is illustrated according to an embodiment of the present invention. The communication protocol is used for communicating information from the PC Card controller 300 to the power switch 304. The 24 clocks illustrated in FIG. 6 make up a frame of communication, and, according to the present embodiment of the present invention, the PCI clock source is used as the reference clock. Between EPSI_A frames, the PC Card controller 300 asserts the EPSI_A terminal to a low level.

All 24 clocks of the frame for EPSI_A are output cycles, where the PC Card controller 300 asserts the EPSI_A terminal with a value consistent with the protocol information given in FIG. 6. There is no acknowledgement phase designed into this protocol, that is, the power switch does not acknowledge the receipt of the information communication in each frame. The EPSI_A element of the present invention communication protocol is a uni-directional data protocol, in which data is transmitted in only one direction. A uni-directional data protocol may contain an acknowledgement phase, since the acknowledgement itself is not considered data in itself.

There are several cycles (8 cycles are shown in the drawing) in the EPSI_A frame that communicate the state of the REQ# signal. This is done to reduce latency in the transfer of this information to the switch, since excessive REQ# latency may have significant negative side-effects, such as performance degradation. Furthermore, in the present embodiment, the state of the REQ# signal is communicated at clock 1 and every fourth clock thereafter. If the clock signal has a period of 30 ns, the latency of the state of the REQ# signal is 120 ns. For the states of INTA# signal and SPKR# signal, the latency is 24*30 ns, i.e., 720 ns.

In addition, there is one reserved cycle that may be used to easily expand the number of terminals transferred to the power switch, or may be used for test purposes. The cycles that communicate prior art PC Card power control information generally send socket VCC and socket VPP requests to the switch, or completely disable the power switch.

Referring to FIG. 7, the PC Card power switch communications protocol for the EPSI_B signal is illustrated according to an embodiment of the present invention. The communication protocol for EPSI_B is used for communicating information from the power switch 304 to the PC Card controller 300. The 26 clocks illustrated in FIG. 6 make up a frame of communication, and, according to an embodiment of the present invention, the PCI clock source is used as the reference clock. Between EPSI_B frames, the PC Card controller 300 and the PC Card power switch 304 place the EPSI_B terminal in a high-impedance (e.g., Hi-Z) state.

The EPSI_B frame consists of several cycles asserted by the PC Card power switch 304, and some cycles asserted by the PC Card controller 300. The EPSI_B element of the communication protocol is a bi-directional data protocol, in which data is transmitted in both directions. The PC Card power switch 304 initiates the frame and transfers state information for the CD1#, CD2#, VS1, VS2 and GNT# throughout the cycles in the frame. The PC Card controller 300 only communicates whether or not to assert the VS1 and/or VS2 signals. The assertion of the VS1 and/or VS2 signals is done when sensing the inserted PC Card's interface and power requirements. The reserved communication cycles in the EPSI_B protocol provide a method to easily expand the number of terminal transferred to the power switch, or may be used for test purposes.

There are several cycles in the EPSI_B frame that communicate the state of the GNT# signal. This is done to reduce latency in the transfer of this information to the switch, since excessive GNT# latency may have significant negative side-effects, such as performance degradation.

Turn-around cycles are provided to avoid bus contention when switching between the devices that assert the EPSI_B terminal. It is common for bi-directional protocols, including uni-directional data protocols with a bi-directional acknowledge phase, to implement a pull-up resistor that holds the protocol signal at logic high while devices attached to the protocol signal are placed in a high-impedance state. Furthermore, it is common for the last device to drive the protocol signal to drive it to a logic high level before releasing it to a Hi-Z state. This common method is used in our protocol for EPSI_B, as illustrated in FIG. 7.

According to an embodiment of the present invention, the power switch may asynchronously assert the EPSI_B terminal to start a frame (e.g., present the first start cycle), when no clock is running. In the prior art, power switches communications protocols have no asynchronous path. However, this feature is added to accommodate the condition that a user plugs in a PC Card while the system is in a low-power state and the PCI clock is stopped. Typically, the Card Sense Block 402 will assert a signal asynchronously to start the PCI clock when this condition occurs. If the CD/VS terminals are transferred to the power switch, then the power switch must perform a similar function. In the protocol, the asynchronous assertion of EPSI_B by the power switch will cause the PC Card controller to start the PCI clock through traditional means.

As described above, eight PC Card controller signals, e.g., the CD/VS signals 307 (CD1#, CD2#, VS1#, and VS2#), the state information for SPKR# signal, the state information of INTA# and REQ#, and the state of the GNT#, are transferred to the PC Card power switch 304. Compared with a conventional PC Card controller, the pin-count or the terminals of the PC Card controller 300 according to embodiments of the present invention can be reduced. Therefore, the PC Card controller 300 may be packaged in a lower pin-count package, which may provide packaging cost and/or area benefits. Furthermore, a PC Card controller according to another embodiment of the present invention may be enhanced with new features and be provided with extra function terminals with minimal impact on pin-count and/or packaging, since some terminals are transferred from a PC Card controller to a PC Card power switch.

Furthermore, referring to FIG. 8, a PC Card power switch communications protocol for EPSI signals is illustrated according to another embodiment of the present invention. The communication protocol for EPSI is used for communicating information from the power switch 304 to the PC Card controller 300. In this embodiment, Smart Card reader logic and flash media card reader logic are integrated into the PC Card controller 300 as extra-function logics. As shown in the drawing, the protocol for EPSI signals includes SC_RST, SCCDN, SCIO_IN, SCIO_OEN, SCIO_OUT, SCPSB, SCPSB etc., which are related to Smart Card IO signals, and MC3VN, MC_LED, MCWPN, MSCDN, etc., which are related to Media card 10 signals. Therefore, the terminals for those signals can be transferred from the PC Card controller 300 to the PC Card power switch 304.

Figure 9:
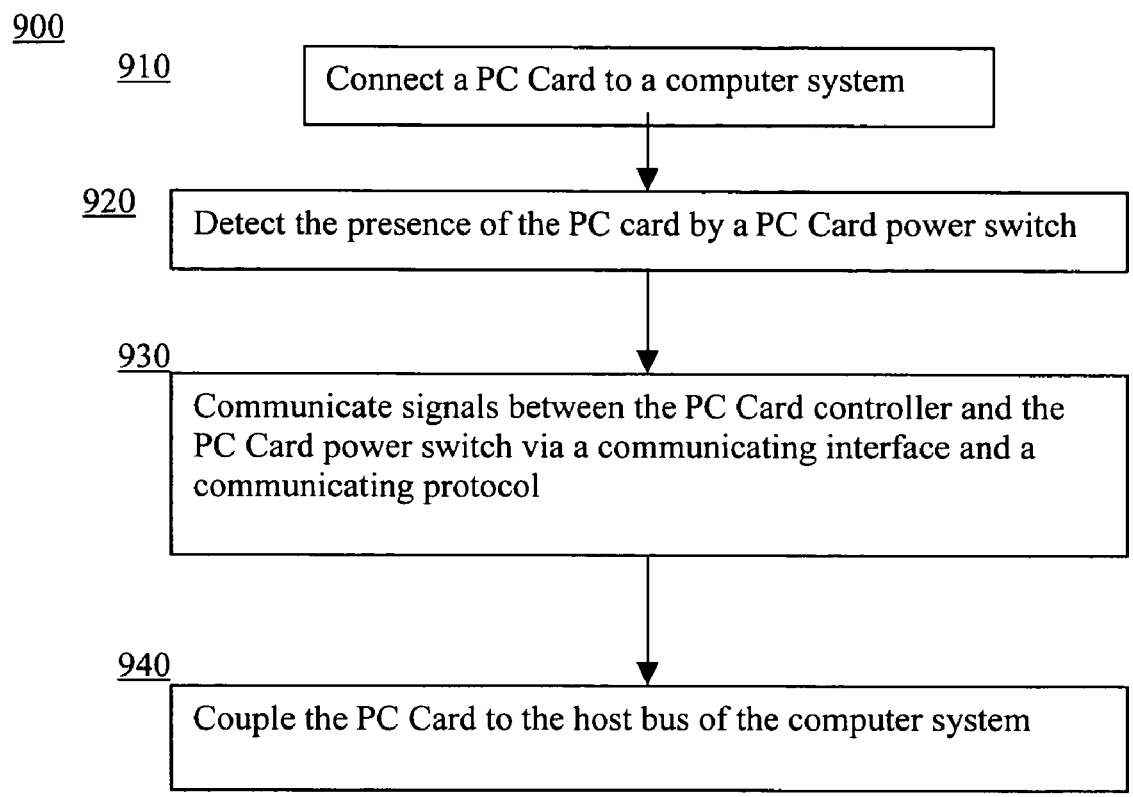
FIG. 9 is a flowchart of a method for operating a PC card according to one embodiment of the present invention.

Referring to FIG. 9, a method 900 to control or operate a PC Card coupled to a computer system in accordance with an embodiment of the present invention is illustrated. In a step 910 of the method 900, a PC card is connected or coupled to the computer system. The computer system can include a host bus, such as a PCI bus and a PCI express bus, for communicating with other elements of the computer system, such as CPU, and memory. The computer system has a PC Card connector for receiving the PC Card and coupling the PC Card to the host bus.

In a step 920, a PC Card power switch is used to detect the presence of the PC Card. According to an embodiment of the present invention, the presence of the PC Card is detected via card detect and voltage sense signals, e.g., CD/VS signals (CD1#, CD2#, VS1#, and VS2#). Once the PC Card is present, e.g., is inserted in the PC Card connector, power is provided to the PC Card from the PC Card power switch.

In a step 930, a communicating interface and a communicating protocol operated thereon are used for communications between the PC Card controller with the PC Card power switch. According to an embodiment of the present invention, state information for three control signals (e.g., the state information of INTA#, the state information of REQ#, and the state information of GNT#), the state information of SPKR#, and the state information of the CD/VS signals are communicated between the PC Card controller and the PC Card power switch.

In a step 940, the PC Card is coupled to the host bus of the computer system. According to an embodiment of the present invention, the host bus complies with the PCI specification. The signals, which include the state information of INTA#, the state information of REQ#, and the state of the GNT# defined in the PCI specification, are communicated between the PC Card power switch and the host bus, and the rest of the signals defined in PCI specification are communicated between the PC Card controller and the host bus. In other words, the signals of the PC Card power switch and the signals of the PC Card controller are cooperated for coupling the PC Card to the host bus of the computer system.

While the foregoing description and drawings represent particular embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A PC Card subsystem in a computer system, said PC Card subsystem comprising:
   a PC Card controller coupled to a PC Card and for operating said PC Card; and
   a PC Card power switch for selecting a power supply to supply power to said PC card and for communicating with said PC Card controller through a communication interface which transfers a state information of at least one control signal, wherein said at least one control signal is transferred between a host bus controller coupled to said PC Card controller and said PC Card cower switch.

2. The PC Card subsystem of claim 1, wherein said PC Card subsystem substantially complies with PCI Specification v2.3 and PC Card Standard, Release 8.0.

3. The PC Card subsystem of claim 1, wherein said communication interface further transfers a state information of a card detect and voltage sense signal, and wherein said card detect and voltage sense signal is transferred between a PC Card connector and said PC Card power switch, and wherein said PC Card connector is coupled to said PC card controller for receiving said PC Card.

4. The PC Card subsystem of claim 1, wherein said at least one control signal comprises an audio driver control signal.

5. The PC Card subsystem of claim 1, wherein said at least one control signal is comprises an interrupt signal.

6. The PC Card subsystem of claim 1, wherein said at least one control signal comprises an arbitration signal transmitted from said host bus controller to said PC card power switch.

7. The PC Card subsystem of claim 1, wherein said at least one control signal comprises an arbitration signal transmitted from said PC card power switch to said host bus controller.

8. The PC Card subsystem of claim 1, wherein said host bus controller provides connection between said PC Card controller and a system CPU.

9. The PC Card subsystem of claim 1, wherein said PC Card controller further comprises a Smart Card reader logic for coupling to a Smart Card and wherein said PC Card power switch has at least one Smart Card control signal for operating said Smart Card.

10. The PC Card subsystem of claim 1, wherein said PC Card controller further comprises a flash media card reader logic for coupling to a flash media card and wherein said PC Card power switch has at least one media card control signal for operating said flash media card.

11. The PC Card subsystem of claim 1, wherein said PC Card controller comprises an arbiter block and a power switch control block, and wherein said state information of said at least one control signal is transferred between said arbiter block and said power switch control block through an internal connection.

12. The PC Card subsystem of claim 3, wherein said PC Card controller comprises a card sense block and a power switch control block, and wherein said state information of said card detect and voltage sense signal is transferred between said card sense block and said power switch control block through an internal connection.

13. The PC Card subsystem of claim 1, wherein communication between said PC Card controller and said PC Card power switch is frame-based.

14. The PC Card subsystem of claim 13, wherein said state information for said at least one control signal is repeated within a frame.

15. The PC Card subsystem of claim 13, wherein a frame comprises a plurality of clock cycles.

16. The PC Card subsystem of claim 3, wherein the said PC Card power switch switches power to said PC card according to said card detect and voltage sense signal received by said PC Card power switch from a said PC Card connector.

17. The PC Card subsystem of claim 1, wherein said PC Card power switch receives a reference clock signal for sampling inputs and for timing outputs.

18. The PC Card subsystem of claim 1, wherein said PC Card power switch comprises an asynchronous path to communicate with said PC Card controller.

19. A PC Card subsystem adapted for coupling a PC card to a computer system, said PC Card subsystem comprising:
a PC Card connector for receiving a said PC card;
a PC Card controller coupled to said PC Card connector and for operating said PC card; and
a PC Card power switch for selecting a power supply to supply power to said PC card and for communicating with said PC Card controller through a communication interface which transfers a state information of a first control signal, wherein said first control signal is transferred between said PC Card connector and said PC Card power switch.

20. The PC Card subsystem of claim 19, wherein said communication interface further transfers a state information of a second control signal between said PC Card controller and said PC Card power switch, and wherein said second control signal is transferred between a host bus controller and said PC Card power switch, and wherein said host bus controller provides connection between said PC Card controller and a system CPU.

21. A computer system comprising:
a CPU coupled to a host bus controller;
a PC Card connector coupled to said host bus controller and for receiving a PC card;
a PC Card controller coupled to the said PC card connector and for selecting a first mode and a second mode; and
a PC Card power switch coupled to said PC Card connector and for selecting a power supply to supply power to said PC card;
wherein in said first mode a control signal for operating said PC Card is transferred between said host bus controller and said PC card power switch, and wherein a state information of said control signal is transferred between said PC Card controller and said PC Card power switch through a first communication interface, and wherein in said second mode, said control signal is transferred between said host bus controller and said PC Card controller though a second communication interface.

22. The computer system of claim 21, further comprising a display device coupled to said host bus controller.

23. The computer system of claim 21, wherein in said first mode a state information of a card detect and voltage sense signal is transferred through said first communication interface, and wherein said card detect and voltage sense signal is transferred between said PC Card controller and said PC Card connector.

24. The computer system of claim 21, wherein the said control signal comprises an audio driver control signal.

25. The computer system of claim 21, wherein said control signal comprises an interrupt signal.

26. The computer system of claim 21, wherein said control signal comprises an arbitration signal.

27. The computer system of claim 23, wherein said PC Card power switch switches power to said PC card according to said card detect and voltage sense signals received by the said PC Card power switch from said PC Card connector.

28. The computer system of claim 21, wherein said PC Card power switch receives a reference clock signal for sampling inputs and for timing outputs.

29. The computer system of claim 21, wherein said PC Card power switch asserts a signal for communicating with said PC Card controller if said PC Card is coupled to the said PC Card connector and said computer system is in a low-power state.

30. A method of operating a PC card coupled to a computer system, said method comprising:
transferring a state information of a card information signal between a PC card power switch and a PC card controller, wherein said card information signal is transferred from a PC card connector to said PC card power switch; and
supplying power to said PC card from said PC card power switch based on said state information of said card information signal.

31. The method of claim 30, wherein said card information signal comprises a card detect and voltage sense signal.

32. The method of claim 30, further comprising:
communicating at least one control signal between said PC card power switch and a host bus controller for operating said PC card; and
transferring a state information of said at least one control signal between said PC card power switch and said PC card controller.

33. The method of claim 32, wherein said control signal comprises an interrupt signal.

34. The method of claim 32, wherein said control signal comprises an arbitration signal transmitted from said host bus controller to said PC card power switch.

35. The method of claim 32, wherein said control signal comprises an arbitration signal transmitted from said PC card power switch to said host bus controller.

36. The method of claim 32, wherein said at least one control signal comprises an audio driver control signal.

37. The method of claim 30, further comprising:
receiving at said PC Card power switch a reference clock signal used by said PC Card power switch for sampling inputs and for timing outputs.

38. The PC Card subsystem of claim 19, wherein said PC Card controller further comprises a Smart Card reader logic for coupling to a Smart Card and wherein said PC Card power switch has at least one Smart Card control signal for operating said Smart Card.

39. The PC Card subsystem of claim 19, wherein said PC Card controller further comprises a flash media card reader logic for coupling to a flash media card and wherein said PC Card power switch has at least one media card control signal for operating said flash media card.

40. The PC Card subsystem of claim 19, wherein said PC Card controller comprises a card sense block and a power switch control block, and wherein said state information of said first control signal is transferred between said card sense block and said power switch control block through an internal connection.

41. The PC Card subsystem of claim 19, wherein said PC Card power switch switches power to said PC card according to said first control signal received by said PC Card power switch from said PC Card connector.

42. The PC Card subsystem of claim 20, wherein said PC Card controller comprises an arbiter block and a power switch control block, and wherein said state information of said second control signal is transferred between said arbiter block and said power switch control block through an internal connection.

* * * * *